Inventors:
HEINRICH FRIES and RICHARD PFEIL

United States Patent Office 3,459,412
Patented Aug. 5, 1969

3,459,412
METHODS OF CONTINUOUSLY FIRING CERAMIC CHARGE MATERIAL IN TUNNEL KILNS, AND TUNNEL KILNS FOR CARRYING OUT THESE METHODS
Heinrich Fries and Richard Pfeil, Laggenbeck, Westphalia, Germany, assignors to Keller Ofenbau G.m.b.H., Laggenbeck, Westphalia, Germany, a firm
Filed Mar. 23, 1967, Ser. No. 625,374
Claims priority, application Germany, Apr. 6, 1966, K 58,941
Int. Cl. F27b 9/14, 9/12
U.S. Cl. 263—28                      14 Claims

ABSTRACT OF THE DISCLOSURE

A method of continuously firing ceramic charge material in a tunnel kiln, comprising the steps of passing the material in a predetermined direction through the kiln, subjecting the material to an oxidizing atmosphere at a first zone in the direction, subjecting the material to a reducing atmosphere in a second zone in the direction, removing oxidizing and reducing atmospheres from the kiln in a direction countercurrent to the direction, and subjecting the material to a cooling gas in a third zone flowing in the direction to cool the material to a temperature which substantially precludes reoxidation.

In a tunnel kiln, means enabling provision of an oxidizing zone, means enabling provision of a reducing zone, at least one blower, at least one suction blower, a plurality of suction outlet apertures opening into the tunnel of the kiln, and a plurality of blast apertures opening into the tunnel of the kiln, the zones and apertures spaced from one another along the tunnel length in the order oxidizing zone, reducing zone, blast apertures, suction outlet apertures, the blast apertures being connected to said blower, said plurality of suction outlet apertures being connected to said suction blower.

Background of the invention

*Field of the invention.* — This invention relates to methods of continuously firing ceramic charge material in tunnel kilns, and to tunnel kilns for carrying out this method.

*Description of prior art.* — In known tunnel kilns in which air is drawn in at the discharge end and is drawn substantially through the entire tunnel kiln to the inlet end, where it leaves the kiln as flue gas, it is normally not possible for charge material to be continuously fired in a reduction atmosphere. For the reducing firing of charge material use is therefore frequently made of muffle kilns which, however, have only a low firing output because of the indirect supply of heat through the heated side walls of the combustion chamber.

In order to eliminate the change between oxidising and reducing operations, which change is necessary for reducing firing in known tunnel kilns, and to avoid the well kown disadvantages thereof, it has already been proposed to effect the heating directly in the oxiding zone and indirectly in the reducing zone by means of muffle passages guided along said zone, the outgoing gases from the muffles being introduced into the oxidising zone and drawn off, together with the outgoing gases of the latter zone, in the opposite direction of flow to the direction in which the charge material is fed, and being discharged from the kiln in the region of the inlet end of the latter. By means of a slide valve protecting the reducing zone at the discharge end of the furnace against the entry of air, or through the dimensioning of the inlet for the air for combustion and the outlet for the outgoing gases, provision has to be made to ensure that in the reduction zone gas does not flow in the longitudinal direction of the kiln.

Apart from the high cost of the installation resulting from the use of muffles, in a kiln of the last-mentioned type it is hardly possible to build up a stable reducing atmosphere which effectively prevents more or less considerable reoxidation of the charge material. This is due, amongst other factors, to the fact that reducing atmosphere passes over to the oxidation zone, which may lead to harmful overheating through after-combustion, and that in order to avoid such overheating it is necessary to dilute the reducing atmosphere in order to lower the proportion of combustible constituents. A reducing atmosphere of this type, however, is generally not sufficiently stable to prevent reoxidation through the entry of air from the discharge end of the kiln.

When the known kiln is equipped with a lock which opens periodically in rhythm with the introduction, then on opening of the lock oxygen-containing air flows into the reduction zone and there will be a periodically intensified flow of reducing atmosphere into the oxidation zone, whereby the charge material in the reduction zone will be at least partly reoxidised and there will be a danger that in the combustion zone the charge material will be overheated or at least subjected to periodically changing combustion temperature fluctuations. The lack of stability in respect of reduction is, in addition, caused by the fact that in the known kiln the charge material leaves the reduction zone at a relatively high temperature and enters a zone containing an atmosphere capable of effecting reoxidation before cooling of the charge material prevents such reoxidation. In theory it is conceivable to give the known tunnel kiln a length such that gradual cooling of the charge material can take place in an atmosphere having only a slight tendency to effect reoxidation. A construction of this type, however, does not reliably prevent the occurrence of reoxidation, while in addition it is impracticable for reasons of economy. Moreover, the expense of operation in the known kiln is increased by the introduction into the muffles of a fraction of the fuel which has been removed from direct combustion in the combustion zone while, in addition, the kiln requires very accurate control.

Summary of the invention

The invention provides a remedy in this connection and starts from a method of continuously firing ceramic charge material in tunnel kilns, wherein the charge material is fired in a zone operated under oxidizing conditions and reduced in a zone operated under reducing conditions, and wherein the combustion gases are drawn off from the combustion zone in the opposite direction of flow to the direction in which the charge material is fed and discharged from the kiln in the region of the admission end of the latter. The invention is characterised in that in an intermediate zone following the reduction zone and limited to a portion of the kiln the charge material is exposed to at least one current of cooling gas and is cooled at least to a temperature which substantially precludes reoxidation. The method of the invention permits the formation of a dense atmosphere which is stable in respect of reduction and effectively prevents reoxidation. Moreover, while the length of the kiln is reduced accurate controllability is obtained without overheating or reoxidation having to be feared when regulation is effected.

According to another feature of the invention, the charge material is exposed to a second current of cooling gas and cooled to approximately discharge temperature in another cooling zone following the intermediate zone. The cooling gas in the intermediate zone is advantageously drawn through the furnace in the same direction as the direction in which the charge material is fed and the second cooling gas current in the opposite direction of flow to the feeding direction. The flow of cooling gases in the intermediate zone which is directed oppositely to the flow of gases in the reduction zone substantially or completely prevents the two currents of gas from mixing and promotes the formation of a neutral or slightly reducing atmosphere in a region situated between the reduction zone and the intermediate zone.

Oxidising additions, for example water or inert gases, which can additionally counteract reoxidation and at the same time accelerate cooling, may in addition be mixed with the first current of cooling gas which according to the invention is blown into the kiln with a high speed of flow. Moreover, water may be introduced into the kiln chamber in the region between the reduction zone and the cooling gas introduction point.

According to still another feature of the invention, a considerable proportion of the total quantity of fuel introduced into the furnace is added in the reduction zone, in which there is thus produced a stable reducing atmosphere which through removal by suction at the inlet end of the kiln passes uniformly into the oxidation zone as continuous replacement, and, after serving its purpose of reduction therein is burned in order to assist in obtaining the firing temperature. The temperature in the combustion zone can thus be controlled or regulated particularly smoothly and accurately. For the purpose of utilising the heat contained in the cooling gas after it has passed out, according to the invention at least part of the cooling gas may be passed to a drier, another part to a final drier preceding the inlet end of the kiln and separated from the latter by a gate, and/or a part may be used as air for combustion in the combustion zone.

A tunnel kiln according to the invention for carrying out the method is characterised by a number of blast apertures which are connected to at least one blower and which in the direction of advance of the charge material follow the reduction zone at a distance therefrom, and by a number of suction outlet apertures connected to at least one suction blower and following at a distance from the blast apertures. A number of blast apertures connected to another blower may be disposed in the kiln roof following and at a distance from the suction outlet apertures. The blast and/or suction outlet apertures are advantageously disposed in each case with their outlets in regions between batches of the charge material. The tunnel kiln according to the invention is further characterised by two main lengths of suction piping, of which one is in each case connected through branch pipes to the suction apertures disposed in a side wall of the kiln, by two manifolds connecting the main suction pipes at their respective ends and leading to the suction sides of respective suction blowers, and by throttle or shut-off means disposed in the main length of suction piping in the regions between the inlets of the branch pipes. This construction permits the variation of the length of the intermediate zone and also of the following second cooling zone, permits intensification or reduction of the suction action in certain zones in the suction outlet region, and also partial removal of cooling gas, which for example is to serve other special purposes. To this end the shut-off means are advantageously adapted to be operated individually, in groups, and/or all together.

For the purpose of controlling or adjusting the quantity of cooling gas to be blown in or drawn off, blowers and suction blowers of variable delivery power are advantageously provided, by means of which the quantities of gas to be blown in and drawn off can at the same time be adapted to one another in such a manner that the currents of cooling gas remain substantially separated from one another. The outgoing air pipes to be connected in each case to the delivery side of the suction blowers can be combined in a common main outgoing air pipe and in the individual outgoing air pipes it is possible for branches and throttle or shut-off means to be inserted before they unite, so that a regulated withdrawal of cooling gas currents to be taken off for special purposes after they have left the kiln is made possible. According to the invention moreover a kiln gate sealing the outlet end of the kiln may be provided at that end, thus preventing the admission of infiltrating air and the influencing of the flows of cooling gas.

Brief description of the drawings

Other features and advantages will be seen from the appended claims and the following description when read in conjunction with the drawing, in which an embodiment of a tunnel kiln operating in accordance with the method of the invention is illustrated somewhat diagrammatically and by way of example, and in which:

Description of the preferred embodiment

Figure 1:
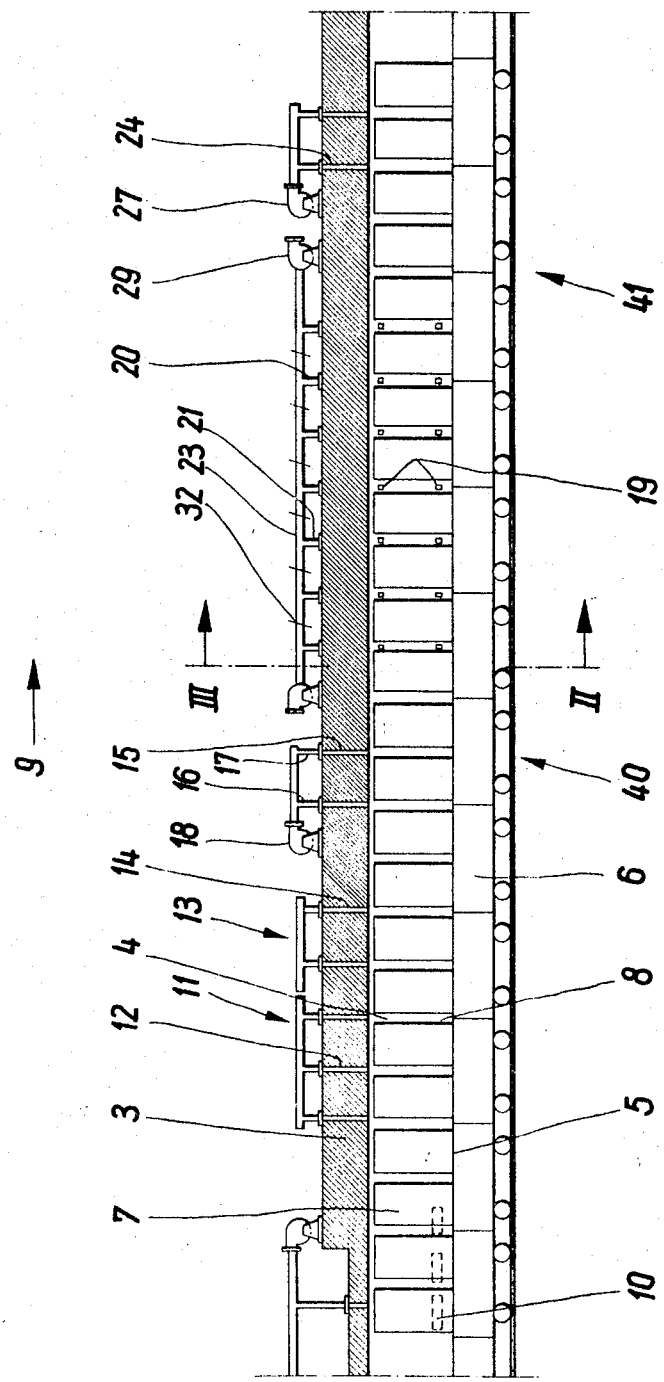
FIG. 1 is a partial elevation of a tunnel kiln of the invention in longitudinal section.
Figure 2:
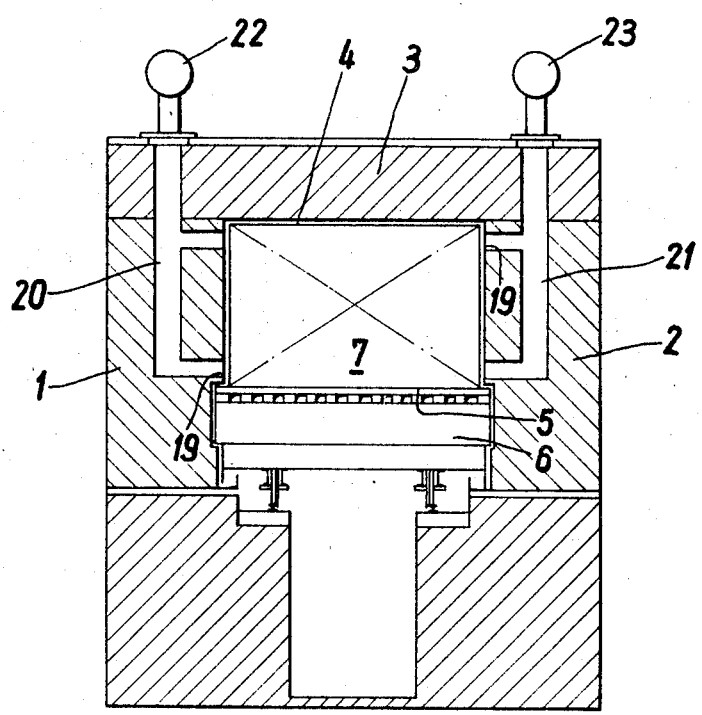
FIG. 2 is a simplified cross-section on the line II—II of FIG. 1.
Figure 3:
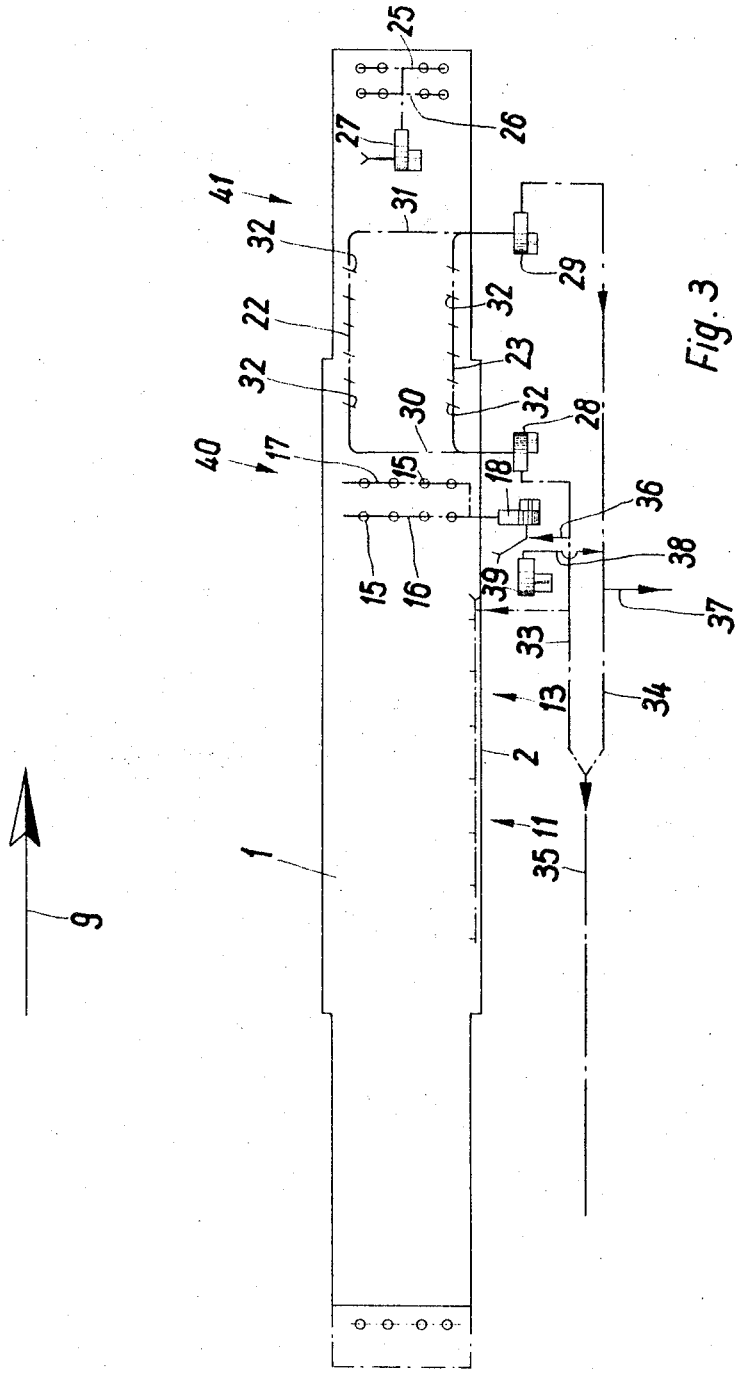
FIG. 3 is a top plan view of the tunnel kiln of FIGS. 1 and 2.

The tunnel kiln illustrated has a combustion passage 4 which is bounded by side walls 1, 2 and a kiln roof and the bottom boundary of which is formed by platforms 5 of tunnel kiln or combustion trucks 6. The charge material is stacked on the tunnel kiln trucks 6 in the form of bundles 7, gaps 8 being left between the stacks 7 of charge material.

The direction of advance of the tunnel kiln trucks carrying the charge material in the tunnel kiln is indicated by the arrow 9. In the region of the kiln inlet end there are provided, in the side kiln brickwork, suction discharge apertures 10 through which the flue gases drawn off from the combustion zone in the opposite direction of flow to the direction of advance 9 of the charge material are discharged from the kiln.

The tunnel kiln has a zone 11 which is operated with an oxidizing atmosphere and in which burners 12 lead into to combustion passage 4 from the roof 3. The oxidizing zone 11 is followed by a zone 13 which is operated with a reducing atmosphere and in which fuel is introduced into the combustion passage 4 from the roof by means of burners 14. The reduction zone 13 is operated in such a manner that it has a higher pressure than the other kiln zones, particularly the oxidation zone and the intermediate zone. Oxidizing or reducing operation is obtained by proportioning the quantity of air for combustion fed into the respective zones simultaneously through the burners or independently thereof. The burners advantageously lead into the gaps 8 left between the respective bundles of charge material during the stacking. It will be understood that the number of burners or rows of burners illustrated for the oxidation and reduction zones respectively is determined in accordance with the applicable operating conditions and may differ from that shown in the drawing.

At a distance downstream of the reduction zone 13, blast pipes 15 lead from the roof 3 into the combustion passage 4, which at their mouths may be provided with interchangeable or adjustable nozzles and which are connected by pipes 16, 17 to a blower 18 the delivery power of which is adjustable.

In the brickwork of the kiln sides 1, 2 following and at a distance therefrom in the direction of advance 9 of the charge material, suction outlet apertures 19 are provided which are connected through branch pipes 20 and 21 respectively to main lengths of suction piping 22 and 23.

The suction outlet apertures 19 are followed at a distance by other blast pipes 24, which lead from the roof 3 into the combustion chamber 4 and are connected by connecting pipes 25, 26 to the delivery side of a blower 27 the delivery power of which is adjustable. The blast pipes 24 are disposed near the discharge end of the kiln. The blast end suction outlet apertures lead in each case into the gaps 8 left between the bundles 7 of charged material.

The main lengths of suction piping 22, 23, of which one is in each case connected by the branch pipes 20 and 21 respectively to the suction outlet apertures 19 disposed in a side wall 1 or 2 of the kiln, are in turn connected by two manifolds 30, 31 which connect the main length of piping at their respective ends and lead to the suction side of respective suction blowers 28, 29 the delivery power of which is variable. In the regions between the entries of the branch pipes 20, 21 into the main lengths of suction piping 22 and 23 respectively there are in each case provided throttle or shut-off means, for example valves 32, by means of which the main lengths of suction piping can be divided into sections. The throttle or shut-off means 32 may be adapted to be operated singly, in groups, and/or all together and be adjusted by hand or by means of suitable actuators.

Air outlet pipes 33 and 34 respectively are connected to the delivery sides of the suction blowers 28, 29 and are united in a main air outlet pipe 35. From the air outlet pipe 33 a branch pipe 36 leads to the suction side of the blower 18, whereby outgoing air, that is to say cooling gas drawn off from the combustion passage, can be fed to the suction side of the blower 18. A pipe 37 branches off from the air outlet pipe 34 and through it the cooling gas drawn off from the combustion passage can likewise be fed, for example, to an air conditioning drier. The main air outlet pipe 35 may in turn be taken to a final drier, in order to enable cooling gas drawn off to be utilised therein. Throttle or shut-off means (not illustrated) are inserted in the pipes 33, 34, 35, 36 and 37 in order to be able to control the partial amounts to be branched off or to adjust the mixture proportion. A pipe 38, through which air or gas can be fed by a blower 39, may in addition lead into the pipe 34.

During operation the charge material, preheated on its passage from the inlet end of the kiln by the flue gases flowing out of the combustion zone to the inlet end of the kiln, passes into the oxidation zone 11, in which it is fired in an oxidising atmosphere.

Thereupon the charge material passes into the reduction zone 13, in which it is reduced in a dense reducing atmosphere. A considerable proportion of the total quantity of fuel fed to the kiln is introduced into the reduction zone of the kiln, namely a quantity such that on the one hand a stable reducing atmosphere is achieved while on the other hand disturbances in the operation of the kiln are avoided. Disturbances in the operation of the kiln could for example occur by feeding so much fuel to the reduction zone that soot or oil deposits are formed on the charge material. It may, for example, be necessary to feed to the reduction zone alone about 30% of the total quantity of fuel introduced into the furnace. In consequence of the gas flow which is brought about by suction discharging through the apertures 10 and which is directed oppositely to the direction of advance 9 of the charge material in the kiln, the reducing atmosphere travels into the oxidation zone 11, in which in order to produce the firing temperature it is burned with the fuel introduced into that zone with the exclusion of air. Smooth, accurate regulation of the firing temperature is effected in a simple manner by varying the quantity of air for combustion or fuel introduced into the combustion zone, particularly the oxidation zone.

In the further course of the combustion operation the charge material completely fired in a reducing atmosphere, after passing through a zone directly adjoining the reduction zone and containing a substantially neutral or slightly reducing atmosphere, passes into an intermediate zone 40 in which it is exposed to a current of cooling gas blown in through the blast tubes 15 at high speed and optionally mixed with additives preventing reoxidation, for example water or inert gases, in order to be cooled for a short time to at least a temperature which prevents reoxidation. In the region between the reducing zone and the charging point for the cooling gas, water may advantageously be introduced into the kiln chamber and evaporated in order to effect cooling without using air. The current of cooling gas enters the combustion chamber 4 approximately vertically, flows in the intermediate zone 40 in the same direction as the direction of advance 9 of the charge material, and leaves the combustion passage in approximately the horizontal direction through the suction outlet apertures 19 in the side brickwork of the kiln.

As the advance continues, the charge material then passes into another cooling zone 41, in which it is exposed to a current of cooling gas in order to be cooled approximately to discharge temperature. This second current of cooling gas is introduced through the blast pipes 24 vertically into the combustion chamber 4 and leaves the latter in the horizontal direction through lateral offtake apertures 19. A gate (not illustrated) which is provided at the outlet end of the kiln closes the combustion passage during the intervals between the discharge movements.

Through the throttle or shut-off means 32 the main lengths of piping 22 and 23 may be and preferably are subdivided so that the first current of cooling gas is drawn off through the suction blower 28 and the second current of cooling gas through the suction blower 29. The deliveries of the blowers 18 and 28 or 27 and 29 respectively are adjusted to one another in such a way that the quantity of cooling gas blown in each case corresponds approximately to the quantity of cooling gas drawn off in each case. In this manner a separation of the individual gas currents is substantially achieved, so that they can be passed on separately for other uses. By varying the subdivision by means of the throttle or shutoff means 32 it is possible for the length of the intermediate zone to be varied simultaneously with or else independently of the length of the second cooling zone. In addition, it is possible for suction discharge from individual charge gaps 8 to be intensified or weakened if the further use of the cooling gases drawn off from the combustion passage makes it desirable to draw off more or less "clean" cooling gas.

The direction of movement of the gas currents in conjunction with the adjustment to one another of the quantities of gas fed and withdrawn assists relatively sharp division of the kiln into the respective different zones and separation of the individual gas currents. The dense reducing atmosphere achieved in the reduction zone, without the risk of overheating, through the distribution of the quantities of fuel introduced over the oxidation and reduction zones is so stable that even in the event of the overflow of cooling gas, the quantity of which in any case is negligible, into the reduction zone there will be no danger of reoxidation, the latter being excluded during the remainder of the process by the rapid cooling of the charge material, or at least reduced to such an extent that it can be regarded as unimportant. The division of the cooling into two stages at the same time avoids the possibility of deterioration of the fired material as the result of too rapid or too low cooling, while the increased stability in respect of reoxidation at the same time enables the kiln to be shortened, thus achieving a corresponding saving of construction and operating costs.

As an alternative to the embodiment illustrated in the drawing, within the scope of the invention it is also possible for the burners in the oxidation zone and/or in the reduction zone to be disposed in the region of the side walls of the kiln instead of in the region of the roof of the latter. Instead of two suction pipes 20, 21 or 22, 23 it is also possible to provide only one or else more pipes.

In addition, it is possible for the cooling gas currents, although introduced approximately perpendicularly into the kiln chamber in the region of the roof of the kiln, nevertheless also to be drawn off approximately perpendicularly in the region of the roof of the kiln or through suction outlet apertures provided in said roof, unlike the embodiment illustrated in the drawing. The cooling gas currents may also be introduced approximately horizontally into the kiln chamber through apertures provided in the side walls of the kiln, and drawn off approximately vertically from the kiln chamber, for example through suction outlet apertures disposed in the roof of the kiln. Finally, it is also possible for the currents of cooling gases to be blown into the kiln chamber in an approximately horizontal direction through apertures provided in the side walls of the kiln and to be drawn off again from the kiln chamber through suction outlet apertures in a preferably offset arrangement. Instead of being disposed upstream of the kiln inlet, the final drier may also be disposed elsewhere, for example next to the furnace or at a greater distance therefrom.

It should be clearly understood that the embodiments hereinbefore described is given by way of example only. Modifications, additions and omissions are possible without departing from the spirit of this invention.

We claim:

1. A method of continuously firing ceramic charge material in a tunnel kiln, comprising the steps of passing the material in a predetermined direction (9) through the kiln, subjecting the material to an oxidizing atmosphere at a first zone in the direction (9), subjecting the material to a reducing atmosphere in a second zone in the direction (9), removing oxidizing and reducing atmospheres from the kiln in a direction countercurrent to the direction (9), and subjecting the material to a cooling gas in a third zone flowing in the direction (9) to cool the material to a temperature which substantially precludes reoxidation.

2. A method as defined in claim 1, and further comprising subjecting the charge material to a plurality of cooling gases.

3. A method as defined in claim 2, and further comprising drawing a second of said cooling gases through said kiln in a direction of flow opposite to the direction (9).

4. A method as defined in claim 1, and further comprising drawing said cooling gas through said kiln in the same direction as the direction (9).

5. A method as defined in claim 2, and further comprising introducing each of said cooling gases in currents into said kiln approximately in vertical direction, at a charging point and withdrawing the same from said kiln approximately in horizontal direction.

6. A method as defined in claim 1, wherein said cooling gas is blown at a high speed of flow into said kiln.

7. A method as defined in claim 1, and further comprising admixing a reoxidation-preventing addition to said cooling gas.

8. A method as defined in claim 1, wherein the pressure in the reducing atmosphere is higher than the pressure in adjoining kiln zones.

9. In a tunnel kiln, means enabling provision of an oxidizing zone, means enabling provision of a reducing zone, at least one blower (18), at least one suction blower (28), a plurality of suction outlet apertures (19) opening into the tunnel of the kiln, and a plurality of blast apertures (15) opening into the tunnel of the kiln, the zones and apertures spaced from one another along the tunnel length in the order oxidizing zone, reducing zone, blast apertures (15), suction outlet apertures (19), the blast apertures (15) being connected to said blower (18), said plurality of suction outlet apertures (19) being connected to said suction blower (28).

10. A tunnel kiln as defined in claim 9, and further comprising a number of further blast apertures (24), a further blower (27), and a roof (3) of said kiln, said further blast apertures (24) being connected to said other blower (27) and disposed in said kiln roof (3) subsequent to and at a distance from said suction outlet apertures (19) in the order oxidizing zone, reducing zone, blast apertures (15), suction outlet apertures (19), further blast apertures (24).

11. A tunnel kiln as defined in claim 9, and further comprising two main lengths of suction piping (22, 23), branch pipes (20, 21), two manifolds (30, 31), suction blowers (28, 29), and a throttle means (32), said main lengths of suction piping (22, 23) being connected at intervals by said branch pipes (20, 21) to said suction apertures (19), said suction apertures (19) being provided in a side wall of the kiln, said two manifolds (30, 31) connecting said main lengths of suction piping (22, 23) at their ends to the suction side of said suction blowers (28, 29), said throttle means (32) being arranged in said main lengths of suction piping (22, 23) in the regions between the entries of said branch pipes (20, 21).

12. A tunnel kiln as defined in claim 11, wherein said throttle means (32) are adapted to be operated singly, in groups, and jointly.

13. A tunnel kiln as defined in claim 11, and further comprising separate air outlet pipes (33, 34) connected to the delivery sides of said suction blowers (28, 29), a common main air outlet pipe (35) connecting said separate air outlet pipes (33, 34) and branch pipes (36, 37, 38) connected to said separate air outlet pipes (33, 34) before the pipes (33, 34) are connected to said common main air outlet pipe (35).

14. A tunnel kiln as defined in claim 13, wherein one of said air outlet pipes (33) is connected by one of said branch pipes (36) to the suction side of said blower (18).

References Cited

UNITED STATES PATENTS

| 1,643,775 | 9/1927 | Kelleher | 263—28 X |
| 2,928,158 | 3/1960 | Miller | 263—28 X |
| 2,960,744 | 11/1960 | Blank | 263—28 X |

JOHN J. CAMBY, Primary Examiner